Patented June 23, 1931

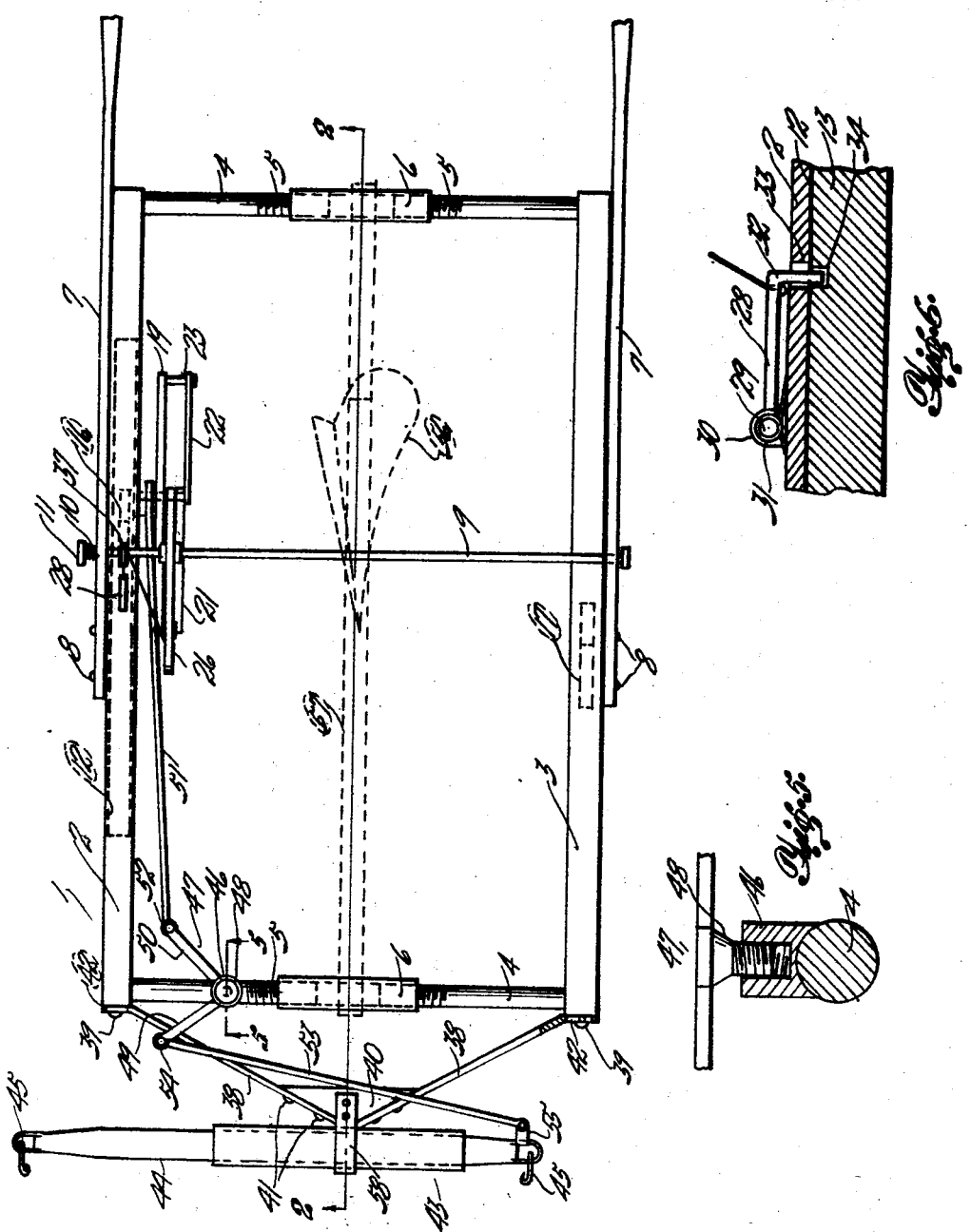

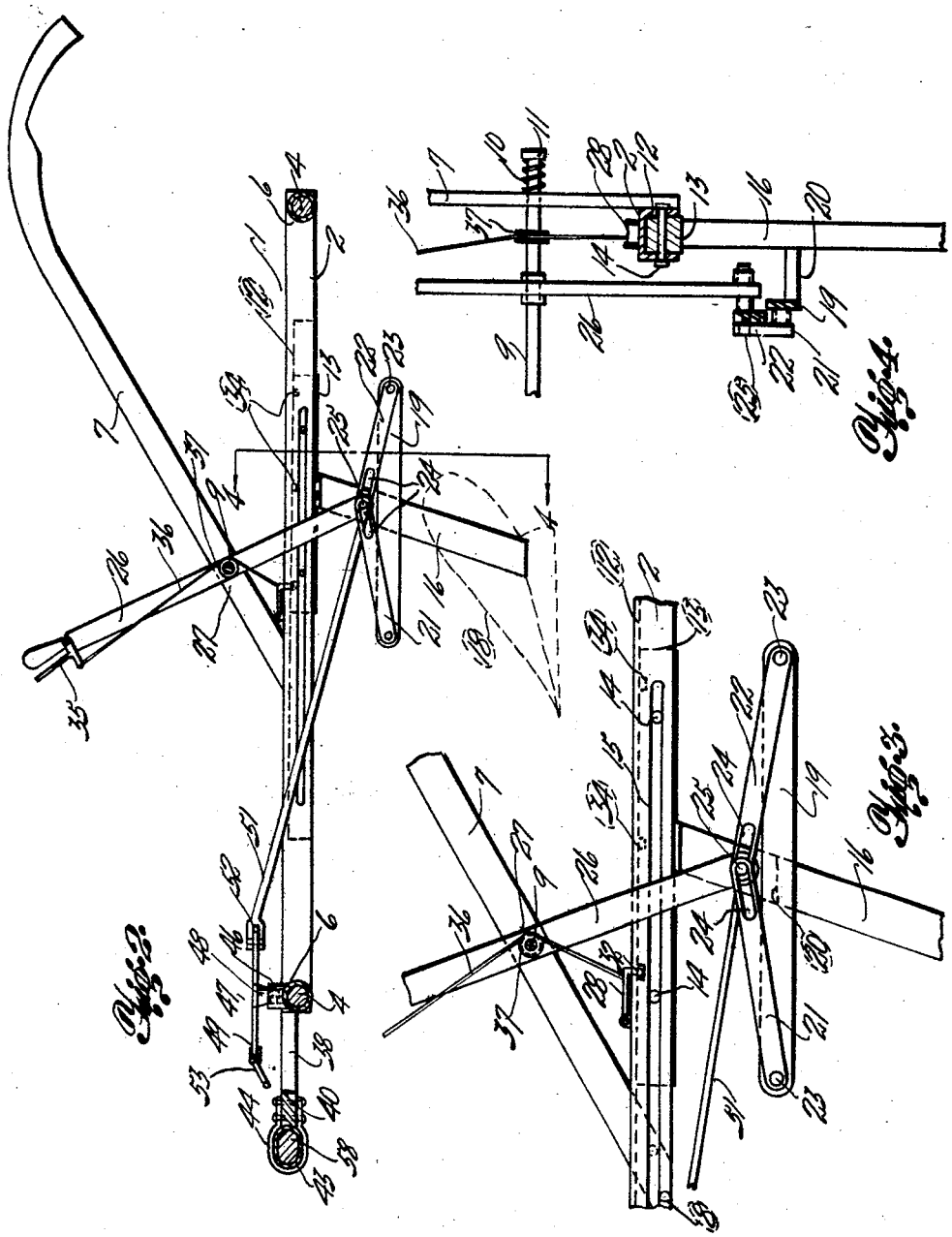

1,811,089

UNITED STATES PATENT OFFICE

JOHN THOMAS LAWRENCE, OF CASTOR, LOUISIANA

PLOW

Application filed December 6, 1929. Serial No. 412,015.

This invention relates to improvements in plows and the main object is to provide a plow having a laterally adjustable draft mechanism or singletree so that the horse pulling the plow may walk at the side of the furrow and at the upper side of the furrow when plowing upon rolling land.

Another object is to provide a plow having laterally spaced feet upon which the plow shares may be mounted, one of the feet being stationary and the other adjustable parallel to the line of travel of the plow so that one of the plows may be set even with, ahead or behind the other to facilitate plowing upon rolling land.

A further object is to provide a plow of this kind in a simple efficient and durable form.

The foregoing and other objects together with means whereby the same may be carried into effect will best be understood from the following description of a preferred embodiment of the invention taken in connection with the accompanying drawing wherein:

Figure 1 is a plan view of the plow showing the singletree shifted to the right and the adjustable foot drawn to the rear.

Figure 2 is a section along the line 2—2 in Figure 1.

Figure 3 is an enlarged inside view of the adjustable foot and the shifting lever.

Figure 4 is an enlarged section along the line 4—4 in Figure 2.

Figure 5 is an enlarged section along the line 5—5 in Figure 1.

Figure 6 is a sectional detail view of the locking latch for the adjustable foot.

In carrying out the invention I provide a frame 1 comprising the side members 2 and 3 at each end of which are provided the cross pieces 4. The ends of the cross pieces 4 are threaded with right and left hand threads as at 5 and are mounted in internally threaded sleeves 6 so that the width of the frame 1 may be adjusted as will be understood. Conventional handles 7 are secured at 8 to the side members 2 and 3 and extend rearwardly and upwardly therefrom, a cross rod 9 being passed loosely through the handles and provided at one end with an expansion coil spring 10 braced between one of the handles and a nut 11 to hold the rod rigid with the frame 1 adjusted to any width. The side member 2 is provided with a longitudinally extended channel or slot 12 in its underside and a slide bar 13 is slidably mounted in this channel and held therein by pins 14 playing in the slots 15. An adjustable foot 16 is extended angularly downward and forward from the slide bar 13 and a similar foot 17 is secured to the underside of the other side member 3, the latter foot being hereinafter referred to as the fixed foot. Conventional plow shares are secured to these feet 16 and 17 in any desired manner as shown at 18.

The adjustable foot 16 carries a bracket 19 in the form of an elongated bar disposed horizontally below the side member 2 and parallel therewith, the said bracket being supported inwardly from the said foot 16 by the bar 20. Links 21 and 22 are pivoted at 23 to the ends of the bracket 19 and have their free ends slotted at 24 to receive the pin 25 carried by the lower end of an adjusting lever 26 which is fulcrumed at 27 to the cross rod 9. It will be readily understood that the foot 16 may be adjusted forwardly or rearwardly by the proper movement of the lever 26 so that the plow carried by that foot may be set even with, ahead of or behind the plow carried by the fixed foot 17. This adjustability of one of the plows relative to the other allows the downhill plow to be set forward of the uphill plow when plowing over rolling or hilly land thus equalizing the pull of the plow and making its guiding easier as will be understood.

In order to releasably lock the foot 16 in any one of its adjusted positions, I provide a latch 28 pivoted at 29 between brackets 30 secured to the side member 2 and spring set by a coil spring 31 to normally cause its nose 32 to bear downward through the aperture 33 provided in the cross member for its reception. A plurality of notches 34 are provided in the top of the slide bar 13 into any of which the nose 32 of the latch 28 may enter to lock the foot 16 in its position. To raise the latch 28 and so release the foot 16

I provide a conventional handle 35 fulcrumed to the end of the lever 26 and connected by a cable 36 to the latch, said cable being trained over a pulley 37 mounted on the cross rod.

The adjustable draft mechanism comprises a pair of converging bars 38 secured to the forward ends of the side members 2 and 3 at 39 and secured to a triangular plate 40 at their inner ends as shown at 41. The outer ends of the bars 38 where they are connected to the side members 2 and 3 are preferably slotted at 42 for the reception of the fastening means 39 to allow for the lateral adjustment of the frame as hereinbefore pointed out as will be understood. A tubular singletree shell or sleeve 43 is secured by a clamp 58 to the plate 40 at the junction of the bars 38, the said sleeve 43 being disposed horizontally and at right angles to the line of travel of the plow as shown. An elongated singletree 44 is slidably mounted through the sleeve 43 and has the conventional draft attaching mechanisms 45 at its ends. An internally threaded socket member 46 is secured to the forward cross piece 4 of the side member 2 adjacent the threaded end of the said cross piece and a bell crank lever 47 is provided the same having a threaded stud 48 at the junction of its two arms 49 and 50 which is seated in the said socket 46. This construction affords both a pivotal point for the bell crank lever 47 and a means for holding it in place upon the cross piece. A link 51 is pivoted on the pin 25 carried by the lever 26 and extends forwardly therefrom, its other end being pivoted at 52 to the arm 50 of the bell crank lever 47. A similar link 53 is pivoted at 54 to the other arm 49 of the lever 47 and is pivotally connected at its opposite end to a bearing 55 secured to the end of the singletree 44.

I will now be understood that a forward movement of the lever 26 will rotate the bell crank lever 47 and so slide the singletree 44 to the right as shown in the drawing and a rearward movement of the lever will of course reverse the position of the singletree. This lateral adjustment of the singletree allows the horse pulling the plow to walk along the side of the row. The forward movement of the lever 26 also slides the adjustable foot 16 rearwardly as will be understood so that the plow thereon is disposed behind the plow on the fixed foot 17 thus compensating for and overcoming the offset line of draft caused by the sliding of the singletree 44 to the right to allow the horse to walk to the right of or above the furrow. A rearward movement of the lever 26 of course moves the foot 16 forward and the singletree 44 to the left with the same result. The adjustment of the foot 16 and singletree 44 is effected simultaneously by the proper movement of the single operating lever 26 and the foot and singletree cooperate to allow the horse to walk above the furrow and to dispose the upper plow rearwardly of the lower plow and so equalize the line of draft on the plow and prevent the normal tendency of the plow to creep to the side when plowing upon hillsides or rolling land. If so desired a plow share 56 may be mounted on a beam 57 secured over the sleeves 6 as shown in the broken lines in Figure 1 and used in lieu of the plows on the feet 16 and 17.

While I have herein set forth a certain preferred embodiment of my invention it is understood that I may vary from the same so as best to construct a practical device for the purposes intended, not departing from the spirit of the invention and within the scope of the appended claims.

I claim:

1. In a device of the kind described, a frame, an adjusting lever fulcrumed in the frame, a singletree sleeve secured to the frame, a singletree slidably mounted in the sleeve, an internally threaded socket member secured on the frame, a bell crank lever, a threaded stud on the said bell crank lever, the said stud being threaded in the said socket member, a link connecting the end of the adjusting lever and the bell crank lever and a link connecting the bell crank lever and the end of the singletree, a fixed plow receiving foot secured to the frame, an adjustable plow receiving foot slidably mounted in the frame, a bracket on the adjustable foot, links pivoted on the bracket and having slots in their free ends, and a pin on the end of the said adjusting lever to receive the slotted ends of the said links.

2. In a device of the kind described, a frame, a fixed plow receiving foot on the frame, a longitudinally adjustable plow receiving foot on the frame, a laterally adjustable draft mechanism on the frame, and means for simultaneously and cooperatively adjusting the said adjustable plow receiving foot and draft mechanism.

3. In a device of the kind described, a frame, including spaced side members, a fixed plow receiving foot secured to one of the side members, a longitudinally adjustable plow receiving foot operatively mounted on the other side member, a lever fulcrumed in the frame and operatively connected to the said adjustable plow receiving foot whereby the same may be adjusted forwardly and rearwardly in the frame, and a laterally adjustable draft mechanism mounted at the front of the frame and connected to the said lever whereby the said draft mechanism may be adjusted laterally of the frame coincident with the longitudinal movement of the plow receiving foot.

In testimony whereof I affix my signature.

JOHN THOMAS LAWRENCE.